Dec. 18, 1934.  G. DE BOTHEZAT  1,985,022
DRIVE FOR FANS AND THE LIKE
Filed Feb. 9, 1931
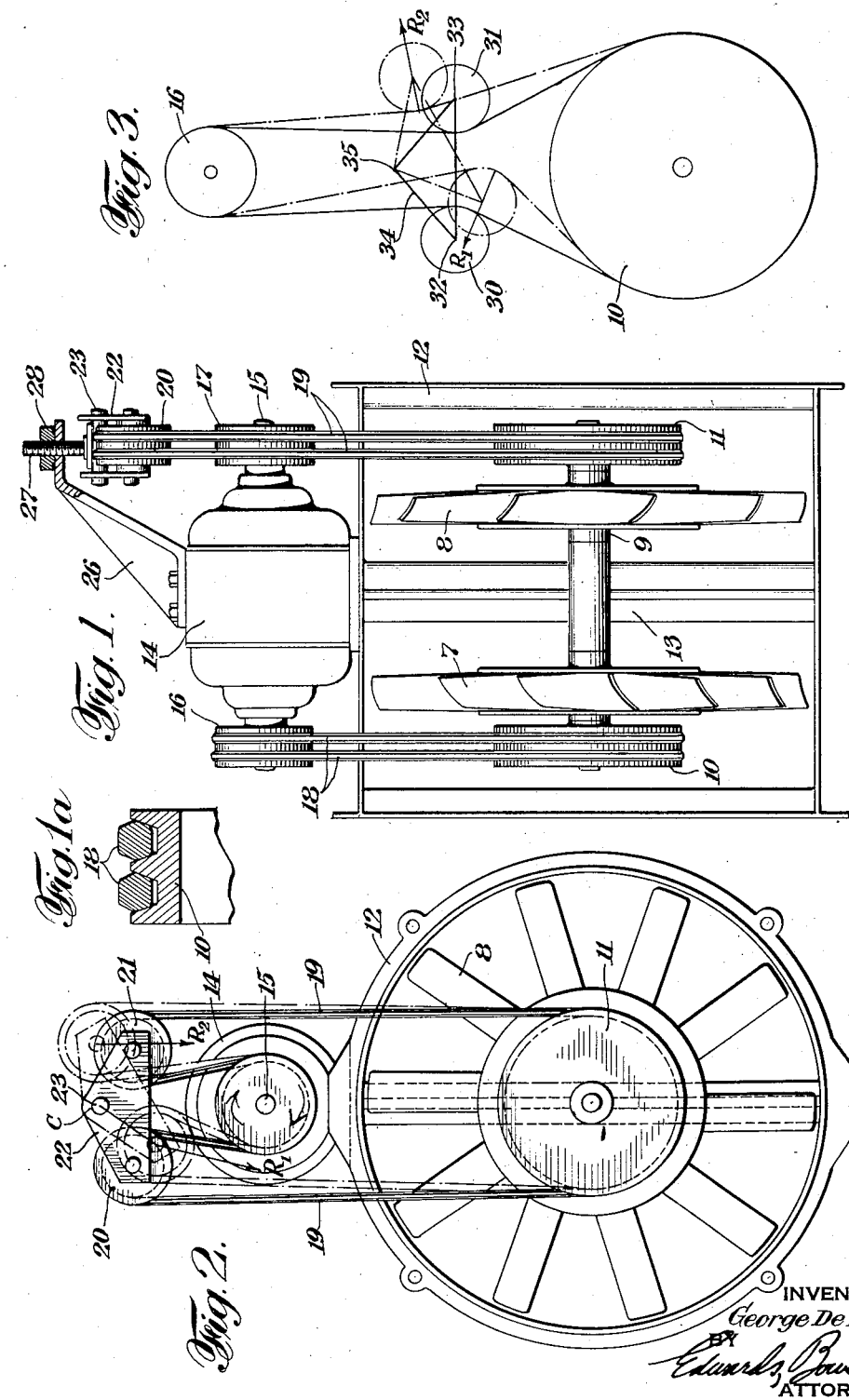
INVENTOR
George De Bothezat
BY
Edwards, Bower & Pool
ATTORNEYS Patented Dec. 18, 1934

1,985,022

UNITED STATES PATENT OFFICE 1,985,022

DRIVE FOR FANS AND THE LIKE

George de Bothezat, New York, N. Y., assignor to American Machine and Metals, Inc., New York, N. Y., a corporation of Delaware Application February 9, 1931, Serial No. 514,505

1 Claim. (Cl. 230—123)

This invention relates to fans for ventilating and the like, and particularly to driving means therefor.

The object of the invention is to provide a simple efficient and quiet drive for a double runner fan receiving the power from a single shaft and using it to drive the fan rotors in opposite directions.

Such double runner fans are specially adapted for obtaining static pressure at low revolutions and resulting in quiet operation, and are often installed in ventilating systems for theatres and the like where any noise is particularly objectionable. The relatively slow rate of rotation of the fan rotors required for quietness would make directly connected motors very obstructive and expensive. Consequently, a single small motor drive for both rotors is preferable if it can be used in efficient quiet manner to drive the rotors in opposite directions.

In the accompanying drawing illustrating the invention

Fig. 1 is a vertical side view of the drive as applied to a double runner fan installation, Fig. 1a is a sectional view on enlarged scale showing the cross sectional shape of the flexible driving ropes or strands, Fig. 2 is an end view of the apparatus shown in Fig. 1, and Fig. 3 is a diagrammatic end view illustrating the operation of the drive at the opposite end.

In the apparatus as illustrated in the accompanying drawing the fan rotors 7, 8 turn in opposite directions as indicated, being mounted upon a central spindle 9 and driven by pulleys 10, 11. Framework 12 is provided having a central support 13 for the spindle 9 and carrying a driving motor 14 in any convenient location.

The motor shaft 15 carries the two driving pulleys 16, 17, the drive from the pulley 16 to the pulley 10 being by means of the tex-ropes 18 with or without the automatic tensioning means illustrated in detail in Fig. 3.

The drive from the pulley 17 to the pulley 11, in order to reverse the direction of rotation, carries the tex-ropes 19 first under the pulley 17 then over idlers 20, 21 and then down around the driven pulley 11.

The idlers 20, 21 are mounted on a frame 22 freely rotating around the supporting pivot point 23, these idlers freely rotating with respect to said frame around the axes 24, 25 respectively. The driving element 19 can be tightened by any suitable arrangement producing a force exerting it upward on the pivot 23 of the frame 22. For instance, the bracket 26 on motor 14 may carry the threaded shaft 27 supporting the pivot pin 23 at its lower end and adjusted by the nut 28 on the upper surface of the bracket.

The driving element 19 passing over the idlers 20, 21 and pulleys 17, 11 as shown, then the pulley 17 if running clockwise will drive the pulley 11 in a counter clockwise direction, and where the frame 22 is permitted to pivot as shown the system will act to automatically tension the driving element in proportion to the driving force exerted. In stationary condition of repose as indicated in Fig. 2 in full lines the various tensions will be substantially equally balanced and the idlers 20, 21 equally spaced from the center line through the axis of pulley 17, but as soon as the transmission is set running and as the pull in the driving element on the driving side is larger than on the running or off-side the resulting driving reaction $R_1$ on the axis 24 of the idler 20 will be greater than the slack reaction $R_2$ on the axis 25 of the other idler 21. This inequality of the reactions $R_1$ and $R_2$ on the axes of the running idlers will produce a side motion of a system of idlers, as shown in dotted lines in Fig. 2, moving idler 20 nearer to the pulley 17 and the idler 21 away therefrom until a natural position of equilibrium is reached around the axis 23. The leverage of the force $R_1$ in relation to the fulcrum C decreases so as to decrease the counter clockwise moment, while at the same time the leverage of the force $R_2$ increases as the system moves sidewise so as to increase the clockwise moment. The condition of equilibrium will be reached when the moments of the force $R_1$ and $R_2$ towards C will become equal in magnitude but opposite in their senses of action, and ignoring, of course, the weights of the parts involved.

A second and more important advantage is the taking up of slack as the system of idlers moves sidewise as indicated in dotted lines. Such movement in effect increases the length of the path of the driving element as can readily be demonstrated geometrically by following a theoretical rotation of the system of idlers around pivot 23 up to the upper position (a rotation of 180° from the lower position). In this upper position the path for the driving element is much longer and as the system of idlers moves from this lower to upper position the required length of the driving element gradually increases. Thus when the system of idlers will be permitted to undergo the side displacement which it naturally tends to take due to the inequality of the driving and slack tensions in the running transmission, this will cause the slack to be taken up automatically and permit the driving element to be run at much higher peripheral velocities than usual. This slack appearing in the running driving element that places a limit on the permissible peripheral velocity of the transmission, particularly with flexible transmitting elements of the chain and tex-rope and belt type.

Of course, a similar system of idlers could be placed at the driven pulley 11 instead of at the driving pulley and with substantially the same results and advantages.

In the reverse drive system of this invention the driving element contacts on one of its faces with the drive pulley and on its other face with the driven pulley and for this purpose the tex-rope elements 19 shown are double faced, cooperating in proper manner with both the bevel grooves of the drive pulley and on the other side with the bevel grooves of the driven pulley as shown in Fig. 1a.

A similar system of idlers may also be used for taking up the slack of a direct drive without reversal, for instance as shown diagrammatically in Fig. 3. The drive pulley 16 is connected to the driven pulley 10 by the tex-rope elements 18, and the idlers 30 and 31 rotating on axes 32, 33 of the supporting frame 34 swing with said frame around the fulcrum or pivot point 35. These idlers 30, 31 contact with the outside surfaces of the driving element 18 between drive pulley 16 and the driven pulley 10, and are balanced in repose as shown in full lines in Fig. 3. When, however, the drive is put into operation the resulting pressure $R_1$ on the idler 31 disposed on the driving side will become larger than the pressure $R_2$ on the driven or slack side of the idler 30. This will produce a side motion of the system of idlers comprising a rotation around the center 35, as shown in dotted lines in Fig. 3. This side motion will produce a decrease of the leverage of $R_1$ towards the center of rotation 35 and an increase of the leverage of $R_2$ towards the same center. Thus when the drive is running the system of idlers will naturally find a position of equilibrium for itself. In addition the slack of the driving element will be taken up by the increase in the length of the path of the driving element caused by the new position of the idlers. This may be observed by measuring on Fig. 3 the length of the driving element in each position, the amount of slack taken up depending upon the distance of the center 35 from the base of the triangular frame 34 of both idlers. By properly selecting this distance or making it adjustable the amount of slack to be taken up can be varied.

The above described system of self-setting idlers by providing for the reverse rotation with the driving elements moving in single planes, and by automatically taking up the slack in proportion to the driving force, gives a very simple and efficient drive utilizing the silent type of transmission provided in particular by the tex-rope units as shown.

I claim:

In a fan apparatus the combination with a driving motor, of a supporting framework therefor comprising a central spider member connected with the base of said motor, a hub carried by said spider, fan means comprising oppositely rotating rotors supported by said hub on opposite sides of said spider, pulley and belt driving means at opposite ends of said motor for rotating said fan rotors in said opposite directions, said driving means including a pair of idlers at one end adapted to loop the belt around the same side of the driving and driven pulleys so as to drive these pulleys in opposite directions.

GEORGE DE BOTHEZAT.